US012783988B1

(12) United States Patent
Taya

(10) Patent No.: US 12,783,988 B1
(45) Date of Patent: Nov. 3, 2026

(54) FEDERATED CONSTRAINT ENFORCEMENT ARCHITECTURE WITH DIFFERENTIATED JUDICIAL OVERSIGHT AND CALIBRATED VALUE ADJUSTMENT FOR OFFLINE-REINFORCEMENT-LEARNING ENTERPRISE AGENTS

(71) Applicant: Venu Gopal Taya, Clermont, FL (US)

(72) Inventor: Venu Gopal Taya, Clermont, FL (US)

( * ) Notice: Subject to any disclaimer, the term of this patent is extended or adjusted under 35 U.S.C. 154(b) by 8 days.

(21) Appl. No.: 19/403,821

(22) Filed: Nov. 29, 2025

(51) Int. Cl.
*G06Q 10/10* (2023.01)
*G06Q 10/06* (2023.01)
*G06Q 10/067* (2023.01)
*G06Q 30/06* (2023.01)

(52) U.S. Cl.
CPC .................................. *G06Q 10/067* (2013.01)

(58) Field of Classification Search
CPC .................................................... G06Q 10/067
USPC .......................................... 705/1.1–912, 348
See application file for complete search history.

(56) References Cited

U.S. PATENT DOCUMENTS

2020/0293933 A1* 9/2020 Ghosh ..................... G06F 18/15
2020/0293950 A1* 9/2020 Sanchez ................. G06N 20/00
2025/0390352 A1* 12/2025 Crabtree ............... G06F 9/5027
2025/0390498 A1* 12/2025 Turrell .............. G06F 16/24556
2026/0037812 A1* 2/2026 Woo ..................... G06N 3/0895

* cited by examiner

*Primary Examiner* — Jonathan P Ouellette

(57) ABSTRACT

A computer-implemented system and method for governed autonomous decision-making in enterprise environments. The system comprises a federated judicial architecture with specialized constraint evaluation nodes having differentiated enforcement powers (VETO, REMAND, OPINION) and asymmetric timeout failure semantics (fail-closed, fail-open). A propensity estimation model estimates a latent logging policy probability distribution; judicial nodes with fail-closed semantics execute unconditionally for each candidate action, while nodes with fail-open semantics are selectively activated when policy divergence exceeds a configurable threshold, providing computational efficiency. A transduction function converts structured judicial verdicts into scalar adjustments calibrated to a statistical dispersion measure of value estimates, enabling mathematical integration with value-based action selection. The system implements bounded aggregate adjustments for numerical stability, judicial augmentation via REMAND resolution, out-of-distribution detection triggering mandatory review, and graduated autonomy modes addressing deployment cold start. Audit records with cryptographic hashes enable verification of decision provenance and substantial reproducibility for regulatory compliance.

18 Claims, 10 Drawing Sheets

FEDERATED CONSTRAINT ENFORCEMENT ARCHITECTURE WITH DIFFERENTIATED JUDICIAL OVERSIGHT AND CALIBRATED VALUE ADJUSTMENT FOR OFFLINE-REINFORCEMENT-LEARNING ENTERPRISE AGENTS

CROSS-REFERENCE TO RELATED APPLICATIONS

Not applicable.

FIELD OF THE INVENTION

The present invention relates generally to computer-implemented artificial intelligence systems for enterprise decision-making, and more particularly to federated, multi-domain constraint enforcement architectures that integrate hierarchical policy evaluation modules (herein termed "judicial oversight mechanisms") with value estimation models for governed autonomous operation in computational environments.

BACKGROUND OF THE INVENTION

Enterprise organizations increasingly seek to deploy autonomous or semi-autonomous AI agents implemented in computational systems for decision-making tasks such as customer service resolution, procurement approval, and resource allocation. However, existing approaches—including retrieval-augmented generation systems, reinforcement learning agents, and training-time constraint encoding methods—suffer from fundamental limitations that prevent safe, auditable, and policy-compliant autonomous operation.

First, monolithic constraint evaluation systems that process all policy types through a single computational pathway cannot scale to enterprise policy complexity due to conflicting computational requirements. A single evaluation module must trade off contradictory requirements: enforcing regulatory compliance requires rigid, high-precision rule adherence with sub-100-millisecond response times to avoid blocking user-facing transactions; enforcing brand voice guidelines requires probabilistic language model inference with latencies often exceeding 500 milliseconds; and enforcing strategic alignment requires real-time integration with external business systems containing inventory levels, pricing rules, and organizational objectives. While parallel execution of multiple evaluation models may be used in certain contexts, such systems typically apply enforcement outcomes uniformly and lack the deterministic precedence hierarchy and differentiated failure semantics required for enterprise-scale governance.

Second, existing constraint enforcement approaches that modify neural network parameters during training to encode policy preferences—such as approaches termed "Constitutional AI" or "RLHF-based alignment"—suffer from fundamental architectural limitations for enterprise deployment. Because constraints are distributed across millions of model parameters rather than maintained as discrete, identifiable rules, constraint violations cannot be traced to specific policy provisions for audit purposes. Furthermore, modifying model weights requires retraining cycles measured in hours or days, whereas enterprise policies may change intra-day in response to regulatory updates or business conditions. Additionally, a single set of model weights cannot simultaneously enforce different constraint sets for different organizational units without maintaining separate model instances, which is computationally prohibitive at enterprise scale.

Third, conventional retrieval-augmented approaches to episodic memory (i.e., collections of historical decision trajectories stored for later reference) suffer from statistical bias arising from off-policy data collection. When an AI system retrieves historical decision records to estimate the value of a candidate action, the retrieved records were generated under a behavior policy (also termed the "logging policy")—the decision-making process, whether human or algorithmic, that created the historical data. This behavior policy may differ systematically from the policy being evaluated. Without correction for the probability that each historical action was selected under the behavior policy—termed the propensity score in causal inference literature—the value estimates exhibit systematic bias, causing the system to erroneously favor actions that were merely frequent in the historical record rather than those that were actually optimal.

Fourth, existing systems lack differentiated enforcement semantics that map constraint types to appropriate remediation actions. Regulatory and legal constraints require hard blocks with no bypass mechanism (termed "fail-closed" semantics, where system failures or timeouts result in action blocking), as violations may create legal liability regardless of business justification. Brand and stylistic constraints require iterative revision with resubmission capability (termed "fail-open with revision" semantics), as the underlying action may be permissible if reformulated. Strategic and operational constraints require value adjustment without blocking (advisory semantics), as violations represent sub-optimal but not prohibited actions. Current systems typically treat all constraints uniformly, either over-blocking by treating all violations as regulatory, or under-enforcing by treating all violations as advisory—neither of which satisfies enterprise operational requirements.

Fifth, deployment of AI decision systems faces a deployment distribution shift problem distinct from training data limitations. Training cold start concerns lack of data for fitting model parameters; deployment cold start concerns lack of deployment-specific outcome data for calibrating trust and autonomy levels. Even a model with high validation accuracy cannot generate reliable value estimates for autonomous operation in a new deployment context because: the state distribution in deployment may differ from training, causing out-of-distribution inputs; the outcome distribution may differ due to organizational, seasonal, or market factors; and no historical propensity scores exist for the deployment context, preventing proper off-policy correction. Prior systems provide no standardized mechanism to gradually increase autonomy based on observed deployment-specific performance.

There is therefore a need for improved computer-implemented architectures that: (i) distribute constraint evaluation across multiple specialized computational modules with differentiated enforcement powers and fail-mode semantics operating via independent computational pathways; (ii) integrate outputs from such constraint evaluation modules as calibrated value adjustments within value estimation pipelines configured to support propensity-corrected learning from historical decision logs; (iii) aggregate constraint evaluation outputs according to a predetermined precedence hierarchy that resolves conflicts between evaluation modules; and (iv) generate machine-readable audit records with cryptographic integrity verification that capture both value estimates and constraint evaluations for deterministic replay and compliance review.

SUMMARY OF THE INVENTION

The present invention provides a computer-implemented system and method for governed autonomous decision-making that integrates a federated, multi-domain judicial architecture with value estimation models configured for propensity-corrected learning from historical decision logs. The invention addresses the foregoing limitations through the following technical innovations:

Federated Judicial Architecture: A plurality of specialized policy evaluation modules (herein "judicial nodes") operating in parallel via independent computational pathways, each configured with: (a) a maximum enforcement power selected from a predetermined hierarchy comprising at least VETO, REMAND, and OPINION levels; (b) configurable timeout failure semantics (fail-closed or fail-open); and (c) domain-specific evaluation logic optimized for the constraint type (regulatory, stylistic, or strategic).

Hierarchical Verdict Aggregation: The judicial nodes communicate via a verdict aggregation module (herein "Judicial Council") that applies a precedence-based aggregation protocol wherein: VETO verdicts unconditionally block action execution regardless of any favorable OPINION scores; REMAND verdicts require resolution before execution may proceed regardless of aggregate OPINION adjustments; and OPINION verdicts contribute score adjustments to the value estimate only when no blocking verdicts exist. When multiple judicial nodes issue verdicts of equal enforcement power, conflicts are resolved according to configurable precedence rules or conservative aggregation (e.g., accepting the most restrictive verdict).

Propensity-Gated Judicial Activation: A propensity estimation model (such as a behavioral cloning model trained on historical decision logs) configured to operate as a runtime gating mechanism for selective judicial evaluation. Judicial nodes configured with fail-closed semantics (such as regulatory compliance evaluators) execute unconditionally for all candidate actions. Judicial nodes configured with fail-open semantics (such as stylistic or strategic evaluators) may be selectively bypassed when divergence between the agent's proposed action probability and the estimated logging policy probability falls below a configurable threshold, thereby reserving non-critical judicial compute for actions that deviate from historical norms while maintaining safety-critical oversight.

Out-of-Distribution State Detection: The propensity estimation model additionally generates a distribution membership score indicating whether the current state falls within the support of the historical decision log. States with distribution membership scores below a configurable threshold trigger mandatory review by all judicial nodes regardless of action divergence or individual node fail-mode configuration.

Judicial-to-Value Transduction: A transduction function that converts structured judicial verdicts (comprising verdict type, scalar score adjustment, and policy citation) into value adjustments mathematically compatible with the value estimation model. Score adjustments from judicial nodes are calibrated to a statistical dispersion metric (such as the empirical standard deviation, denoted $\sigma$) of the value estimator's output distribution, ensuring commensurability between judicial assessments and learned value estimates regardless of the underlying estimation methodology.

Decision Synthesis via Judicial-Adjusted Value: Action selection by maximizing a composite value defined as $\hat{V}(s,a)+\Sigma J(s,a)-\alpha\cdot U(s,a)-\beta\cdot OOD(s,a)$, where $\hat{V}(s,a)$ represents the base value estimate from the value estimation model, $\Sigma J(s,a)$ represents the bounded sum of transduced OPINION score adjustments (each J being a scalar adjustment from an individual judicial node), U(s,a) represents epistemic uncertainty in the value estimate, and OOD(s,a) represents an out-of-distribution penalty. This composite value is herein referred to as the "Judicial-Adjusted Value."

Bounded Aggregate Adjustment: A stability constraint applied to aggregate judicial score adjustments, limiting the magnitude of $\Sigma J(s,a)$ to a configurable multiple of the value estimator's empirical output dispersion (e.g., $[\Sigma J]|\leq k\times\sigma$), preventing any single judicial node from dominating the composite score and ensuring numerical stability in the action selection process.

Judicial Learning Augmentation: Upon successful resolution of a REMAND verdict (wherein a revised action satisfying the remanding judicial node's requirements is submitted), the system records the revised action and its resolution context in the episodic memory store with elevated sampling priority for subsequent training of the value estimation model, treating judicially-corrected actions as high-signal training data that reflects expert-validated decision patterns.

Verifiable Audit Architecture: Generation of machine-readable audit records comprising: state feature vectors, candidate action specifications, propensity estimates under the logging policy, all judicial verdicts with policy citations, composite value estimates, model version identifiers, and cryptographic hashes covering the complete decision record. The audit architecture captures sufficient information to enable substantially deterministic replay of any historical decision for compliance verification, debugging, model validation, or regulatory examination.

Graduated Autonomy Protocol: A deployment mechanism comprising a sequence of operating modes (such as FULL_ESCALATE, RECOMMEND, and AUTONOMOUS) with configurable transition criteria based on operational metrics including agreement rate with human decisions, out-of-distribution detection frequency, and judicial override rate. Autonomy level increases only when statistical validation criteria are satisfied for a minimum observation period, addressing the deployment distribution shift problem identified in the prior art.

DETAILED DESCRIPTION OF THE INVENTION

1. Definitions

As used herein, the following terms have the indicated meanings:

"Judicial node" or "policy evaluation module" refers to a specialized computational module configured to evaluate candidate actions against a specific constraint domain and output a standardized Verdict data structure. In some embodiments, judicial nodes are also referred to as "judge configuration modules."

"Judicial Council" or "verdict aggregation module" refers to the computational component that receives verdicts from multiple judicial nodes and resolves them according to a precedence hierarchy to produce a combined verdict or aggregate score adjustment.

"Propensity score" refers to the estimated probability $\hat{\pi}$_β(a|s) that a candidate action would have been selected under the logging policy that generated the historical decision data.

"Episodic memory store" refers to a database containing historical decision events, each comprising at minimum a state representation, action taken, outcome observed, and metadata sufficient for propensity estimation and value learning.

"Transduction" refers to the process of converting a semantic, linguistic, or categorical assessment (e.g., "This action is moderately risky" or "This action strongly advances a strategic goal") into a normalized scalar value mathematically compatible with value function optimization. The scalar value is calibrated relative to the variance or dispersion of value estimates, as described in Section 6.

"Fail-closed" refers to a failure mode wherein a timeout or error condition causes the system to block the action and route to human review, rather than defaulting to approval.

"Fail-open" refers to a failure mode wherein a timeout or error condition causes the system to proceed with a warning logged, rather than blocking the action.

"Q-value" or "value estimate" refers to an estimate of expected cumulative reward or utility for a state-action pair. While a preferred embodiment uses offline reinforcement learning for Q-value estimation, alternative embodiments may use supervised learning models, heuristic scoring functions, ensemble methods, or rule-based systems. Throughout this disclosure, "value estimation model" refers generically to any such system.

2. System Architecture Overview

Figure 1:
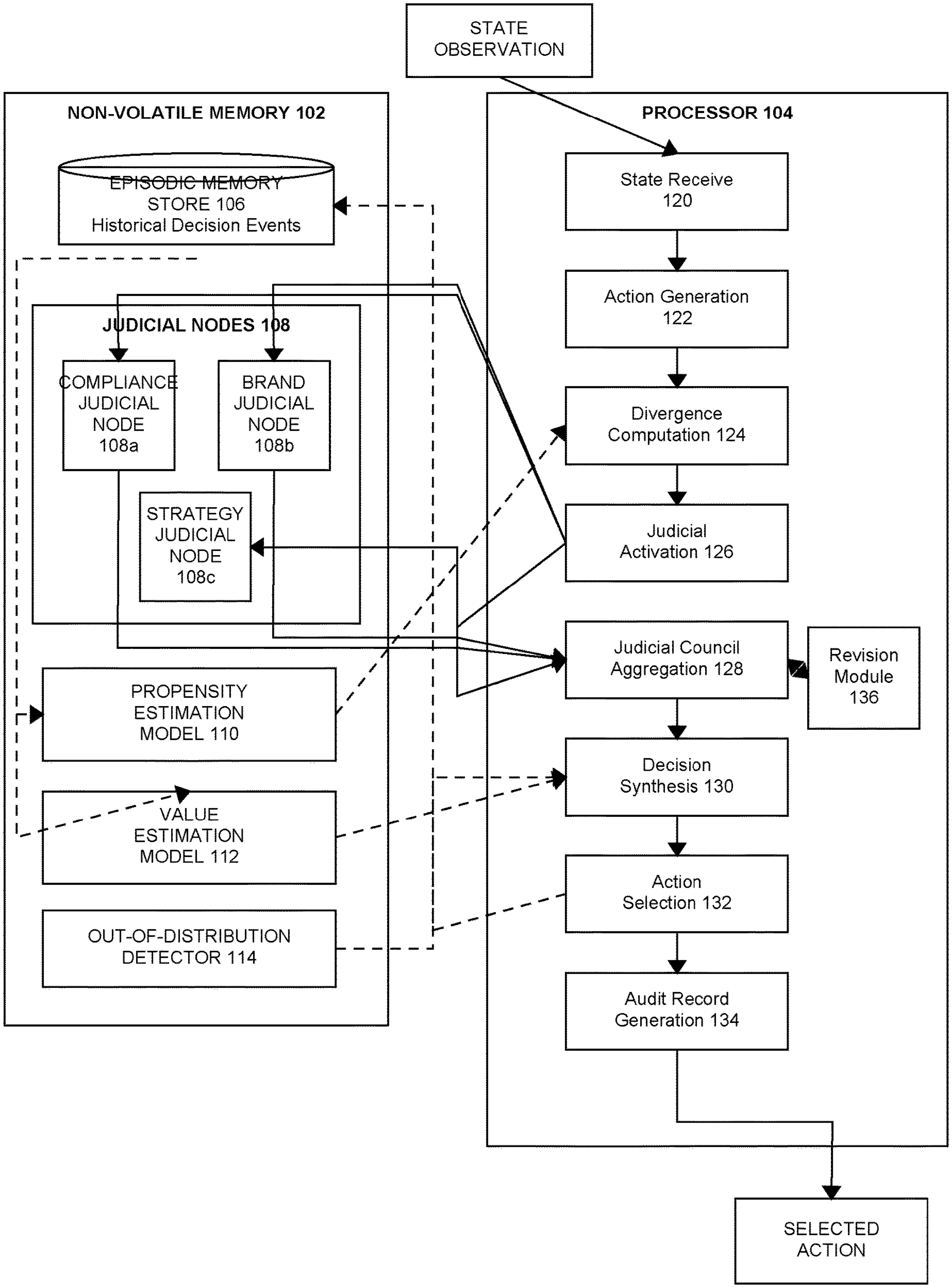
FIG. 1 is a block diagram illustrating an exemplary system architecture according to an embodiment of the present invention, including non-volatile memory (102), processor (104), episodic memory store (106), judicial nodes (108*a-c*), propensity estimation model (110), value estimation model (112), and out-of-distribution detector (114).

Referring to FIG. 1, an embodiment of the present invention comprises a computer-implemented autonomous enterprise decision system 100. The system 100 includes non-volatile memory 102 coupled to one or more processors 104. The non-volatile memory 102 stores: (i) an episodic memory store 106 containing historical decision events; (ii) a plurality of judicial nodes **108*a*, 108*b*, 108*c* (also referred to as judge configuration modules or policy evaluation modules) associated with constraint domains and enforcement powers; (iii) a propensity estimation model 110 (such as a behavioral cloning model) configured to estimate a latent logging policy; (iv) a value estimation model 112 (such as an offline reinforcement learning model); (v) an out-of-distribution detector 114; and (vi) a verdict aggregation module 116** (also referred to as the Judicial Council) configured to aggregate verdicts from the judicial nodes according to a precedence hierarchy.

The processor 104 implements decision logic including: state reception 120; action generation 122; divergence computation 124; judicial activation 126; verdict aggregation 128 (executed by the Judicial Council 116); decision synthesis 130; action selection 132; and audit record generation 134. In some embodiments, the processor 104 additionally implements a revision module 136 configured to generate revised candidate actions in response to REMAND verdicts, as described in Section 8.

3. Verdict Data Structure

Figure 2:
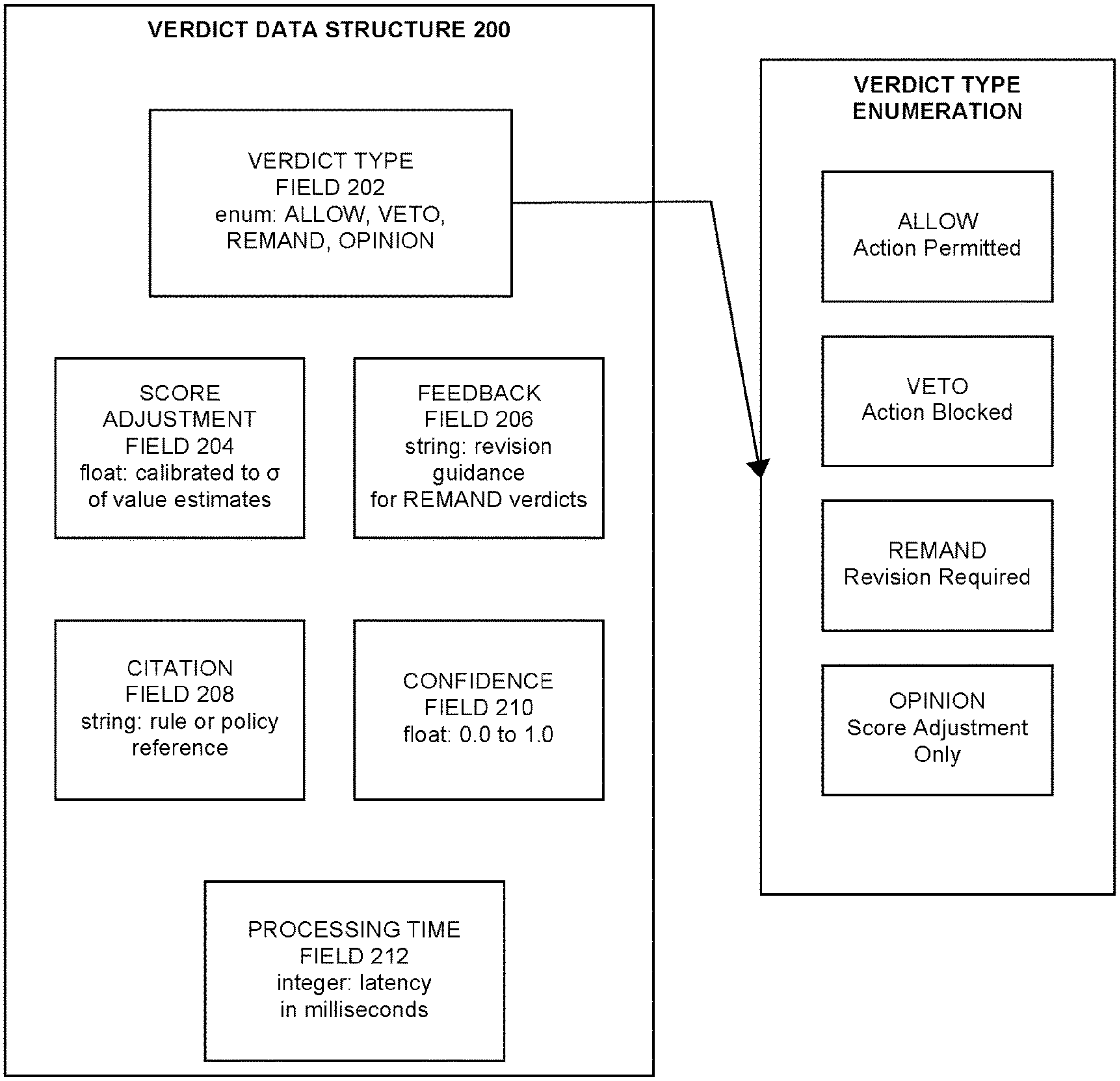
FIG. 2 is a schematic diagram illustrating a Verdict data structure (200) generated by judicial nodes according to an embodiment of the present invention, including verdict type field (202), score adjustment field (204), feedback field (206), citation field (208), confidence field (210), and processing time field (212).

Referring to FIG. 2, each judicial node outputs a standardized Verdict data structure 200 that in some embodiments comprises at least: verdict_type 202 (enumerated as ALLOW, VETO, REMAND, or OPINION); score_adjustment 204 (a floating-point value for OPINION verdicts, calibrated as described in Section 6); feedback 206 (textual guidance for REMAND verdicts); citation 208 (identifying the specific rule, regulation, or policy provision triggering the verdict); confidence 210 (the judicial node's confidence in its assessment); and processing_time_ms 212 (latency measurement for monitoring). Additional fields may be included without departing from the scope of the invention.

The Verdict data structure 200 is machine-readable and serializable, enabling storage in the episodic memory store 106 and inclusion in audit records 134.

4. Specialized Judicial Nodes

Figure 3:
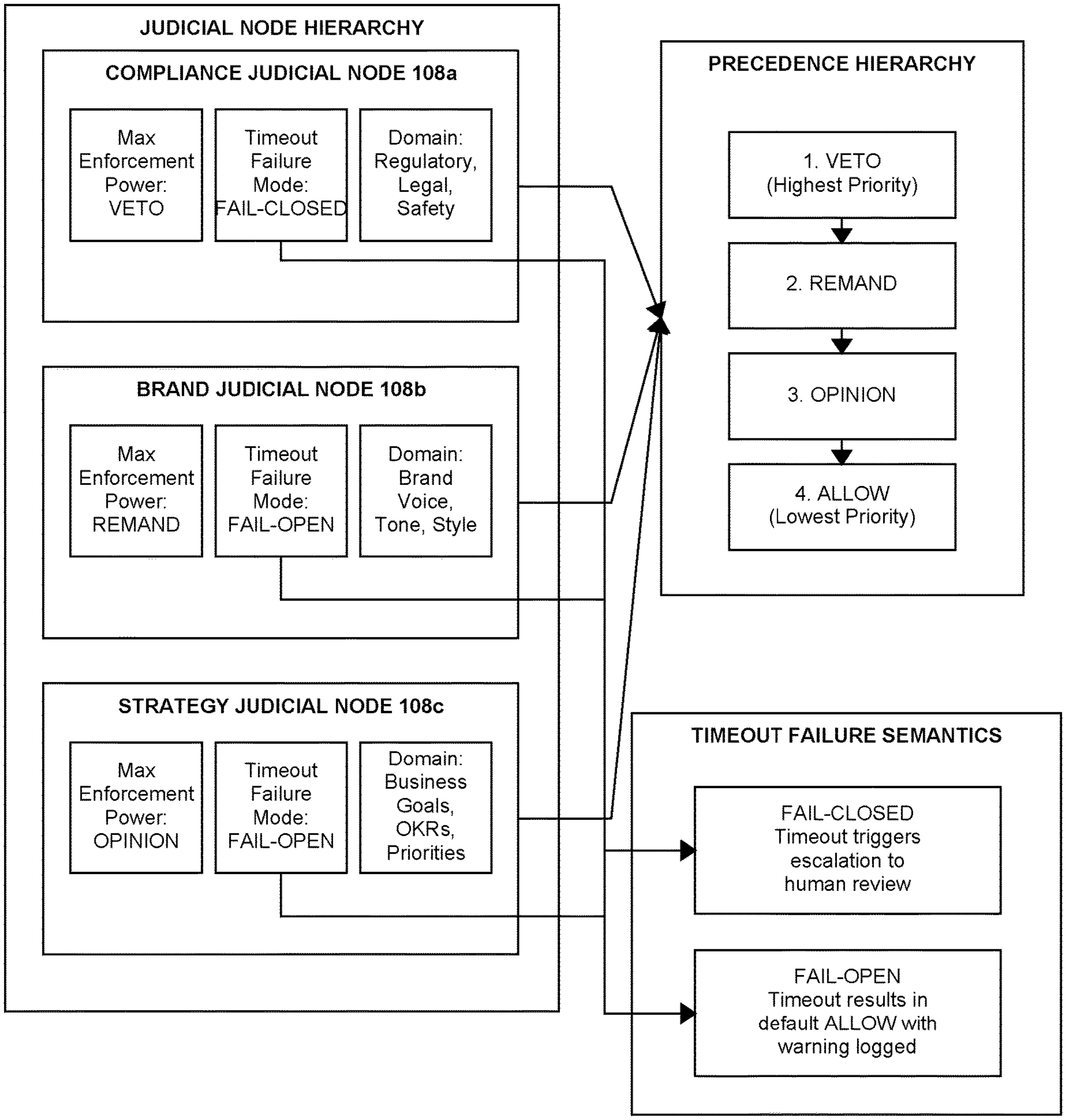
FIG. 3 is a hierarchy diagram illustrating specialized judicial node types (108*a-c*), their maximum enforcement powers, timeout failure semantics, and precedence relationships according to an embodiment of the present invention.

Referring to FIG. 3, the system implements specialized judicial nodes organized by constraint domain. In a preferred embodiment, three classes of judicial nodes are provided, though additional domain-specific nodes may be added without departing from the scope of the invention:

Compliance judicial node 108*a* (also referred to as "Compliance Court"): Configured with maximum enforcement power of VETO, fail-closed timeout semantics, and, in some embodiments, a latency target of less than approximately 50 milliseconds. The Compliance judicial node implements domain-specific evaluation logic for regulatory requirements, legal constraints, and safety-critical rules.

Brand judicial node 108*b* (also referred to as "Brand Court"): Configured with maximum enforcement power of REMAND, fail-open timeout semantics, and, in some embodiments, a latency target of less than approximately 500 milliseconds. The Brand judicial node implements domain-specific evaluation logic for brand voice, tone, style guidelines, and customer communication standards.

Strategy judicial node 108*c* (also referred to as "Strategy Court"): Configured with maximum enforcement power of OPINION, fail-open timeout semantics, and, in some embodiments, a latency target of less than approximately 100 milliseconds. The Strategy judicial node implements domain-specific evaluation logic providing score adjustments based on strategic alignment with OKRs, inventory levels, margin targets, and business priorities.

In some embodiments, the fail-mode semantics are static. In other embodiments, fail-mode semantics may be dynamically adjusted based on runtime context, as described in Section 13.

5. Propensity-Gated Judicial Activation

The propensity estimation model 110 (such as a behavioral cloning model) serves two distinct purposes. During training, it estimates the latent logging policy π_β(a|s) from historical decision data for importance sampling weight computation. During inference, it provides a runtime trigger for selective judicial activation.

Specifically, the judicial review is selectively activated based on a policy divergence metric, such as Kullback-Leibler divergence, Wasserstein distance, Jensen-Shannon divergence, or other statistical distance measures between probability distributions. In a preferred embodiment:

$$\text{divergence}(s,a)=D\_KL(\pi\_\text{agent}(\cdot|s)\,\|\,\hat{\pi}\_\beta(\cdot|s))$$

where π_agent(·|s) denotes the target agent policy that proposes candidate actions for the state s, and $\hat{\pi}$_β (·|s) denotes the estimated logging policy produced by the propensity estimation model 110.

When the divergence exceeds a configurable threshold τ_divergence, the Judicial Council 116 is invoked for full review by all judicial nodes. When divergence is below threshold, the system unconditionally routes actions to fail-closed judicial nodes (e.g., Compliance judicial node 108*a*), while conditionally bypassing fail-open judicial nodes (e.g., Strategy judicial node 108*c* and, in some embodiments, Brand judicial node 108*b*). This selective activation provides computational efficiency by focusing judicial resources on actions that depart significantly from historical human decision patterns.

This propensity-triggered gating represents a key technical improvement over prior art systems that evaluate every action uniformly, regardless of how closely the action matches historical behavior.

Additionally, when the out-of-distribution detector 114 indicates the current state falls outside the support of the historical decision log (distribution membership score below a configurable threshold θ_OOD), mandatory full judicial review by all judicial nodes is triggered regardless of action divergence. This ensures novel states receive comprehensive oversight even when proposed actions superficially match historical patterns.

6. Judicial-to-Value Transduction Function

The system implements a Judicial-to-Value Transduction Function (JVTF) that converts structured verdict outputs into scalar values mathematically compatible with the value estimation model 112. The transduction operates differently based on verdict type:

For VETO verdicts, the transduction function maps to a sentinel value that gates the argmax operation, excluding the action from consideration entirely.

For REMAND verdicts, the transduction function triggers the bounded revision loop described in Section 8. Only actions with no unresolved REMAND verdicts proceed to the argmax selection.

For OPINION verdicts, the transduction function maps the judicial assessment to a score_adjustment value calibrated to the empirical standard deviation σ of the value estimation model's outputs computed over a validation dataset:

$$J(s,a)=\text{JVTF(verdict)}=\text{verdict.score\_adjustment}\times\sigma$$

A score_adjustment magnitude of 1.0 corresponds to one empirical standard deviation of value estimates observed in the episodic memory store 106. This calibration ensures that judicial assessments and learned value estimates operate on commensurable scales regardless of the underlying value estimation methodology.

In a preferred embodiment, σ is computed once during model deployment as the empirical standard deviation of value estimates $\hat{V}$(s,a) taken over a representative validation set, and the same σ is reused to normalize both individual and aggregate judicial adjustments as described in Sections 7 and 9. In alternative embodiments, σ may be periodically updated as the episodic memory store 106 grows.

While the preferred embodiment calibrates to the empirical standard deviation, alternative embodiments may use other statistical dispersion metrics such as interquartile range, median absolute deviation, or percentile-based measures.

7. Bounded Aggregate Adjustment

To prevent any single judicial domain from dominating the decision synthesis and to ensure numerical stability, the system enforces a bounded aggregate adjustment constraint:

$$|\Sigma\_i\ J\_i(s,a)|\leq k\times\sigma$$

Where k is a configurable bounding parameter (default k=2) and σ is the same empirical standard deviation used for individual adjustment calibration. When aggregate adjustments would exceed the bound, proportional scaling is applied.

In a preferred embodiment, proportional scaling comprises multiplying each individual adjustment J_i(s,a) by a common scaling factor $\lambda=(k\times\sigma)/|\Sigma\_i\ J\_i(s,a)|$ such that the scaled sum exactly equals the bound. Alternative embodiments may employ clipping (truncating the excess) or other normalization schemes.

This bounding mechanism prevents reward hacking (where adversarial judicial configurations could dominate learned value estimates) and ensures the value estimation model's learned function remains the primary decision driver while judicial assessments provide calibrated adjustments.

8. Bounded Revision Loop and Judicial Augmentation

When a REMAND verdict is issued, the system initiates a bounded revision loop comprising: (i) extracting revision feedback from the REMAND verdict's feedback field 206; (ii) generating a revised candidate action using the revision module 136; (iii) resubmitting the revised action to the Judicial Council 116; (iv) repeating steps (ii)-(iii) up to a maximum of N attempts (configurable, default N=3); (v) upon successful approval (no VETO or REMAND verdicts), proceeding with the revised action; (vi) upon exhaustion of attempts without approval, routing to fallback handling.

The revision module 136 may be implemented as: a language model configured to generate revised action parameters based on the feedback 206; a rule-based transformation engine applying domain-specific revision rules; a template-based system substituting compliant alternatives; or a human-in-the-loop interface presenting the feedback to an operator. The specific implementation depends on deployment requirements and action complexity.

Fallback handling upon exhaustion of revision attempts comprises one or more of: (i) escalating the decision to human review with the complete revision history; (ii) selecting an alternative candidate action that has not received a REMAND verdict; (iii) skipping the action entirely if the business context permits; or (iv) proceeding with the original action with an explicit non-compliance flag logged for audit purposes. The fallback behavior is configurable per deployment.

Upon successful resolution of a REMAND loop, the system implements a Judicial Augmentation mechanism. The revised action is inserted into the episodic memory store 106 with an elevated priority weight w_priority>1.0 (default w_priority=2.0). This treats judicial correction as high-signal training data, effectively using the judicial process to generate labeled counterfactual state-action pairs that improve future policy learning. The elevated priority weight causes the revised action to be sampled more frequently during subsequent training of the value estimation model 112.

9. Decision Synthesis Equation

Figure 8:
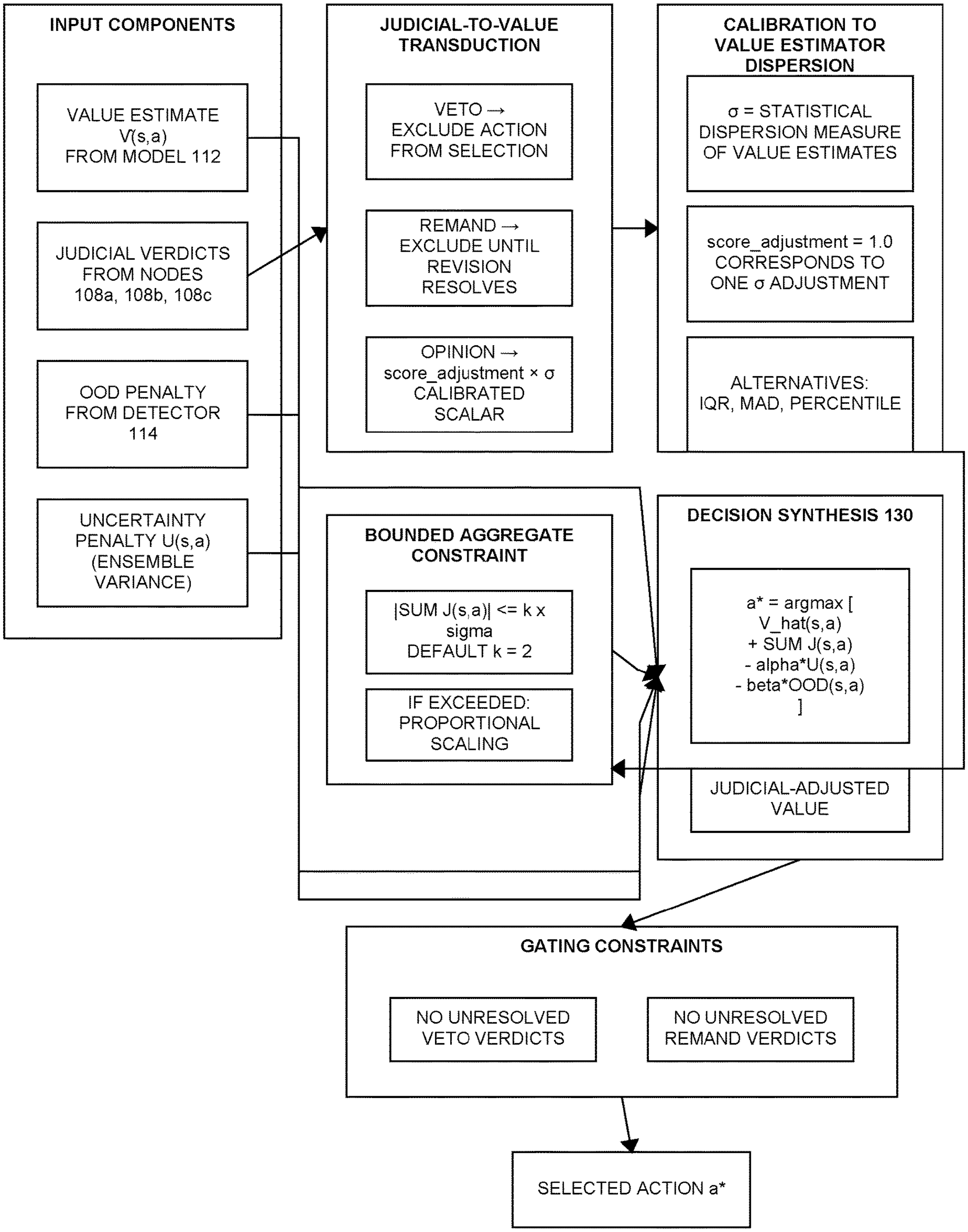
FIG. 8 is a data flow diagram illustrating computation of a Judicial-Adjusted Value for decision synthesis (130) according to an embodiment of the present invention, including judicial-to-value transduction, calibration to value estimator dispersion, and gating constraints.

Referring to FIG. 8, the decision synthesis module 130 selects actions by computing a Judicial-Adjusted Value (also referred to as Judicial-Adjusted Q-Value in reinforcement learning embodiments) for each non-blocked candidate action:

$$a^*=\text{argmax\_}a[\hat{V}(s,a)+\Sigma J(s,a)-\alpha\cdot U(s,a)-\beta\cdot \text{OOD}(s,a)]$$

Where: $\hat{V}(s,a)$ is the value estimate from the value estimation model 112; Σ J(s,a) is the bounded sum of transduced OPINION score adjustments; U (s,a) is an uncertainty penalty; OOD(s,a) is the out-of-distribution penalty from detector 114; and α, β are configurable weight parameters controlling the influence of uncertainty and distribution shift on action selection.

In a preferred embodiment, U (s,a) represents an uncertainty measure derived from variance across an ensemble of value estimation models, bootstrap-based confidence intervals for $\hat{V}(s,a)$, or dropout-based uncertainty estimation. Higher uncertainty values penalize actions for which the value estimate is less reliable.

The argmax operation is subject to gating constraints: (i) any candidate action associated with a VETO verdict is excluded from the argmax; (ii) any action associated with an unresolved REMAND verdict is excluded unless the revision loop has completed successfully; and (iii) in some embodiments, actions may be excluded when the effective sample size (ESS) for that state-action region falls below a minimum threshold, ensuring sufficient historical support for reliable value estimation.

10. Hybrid Out-of-Distribution Detection

Figure 6:
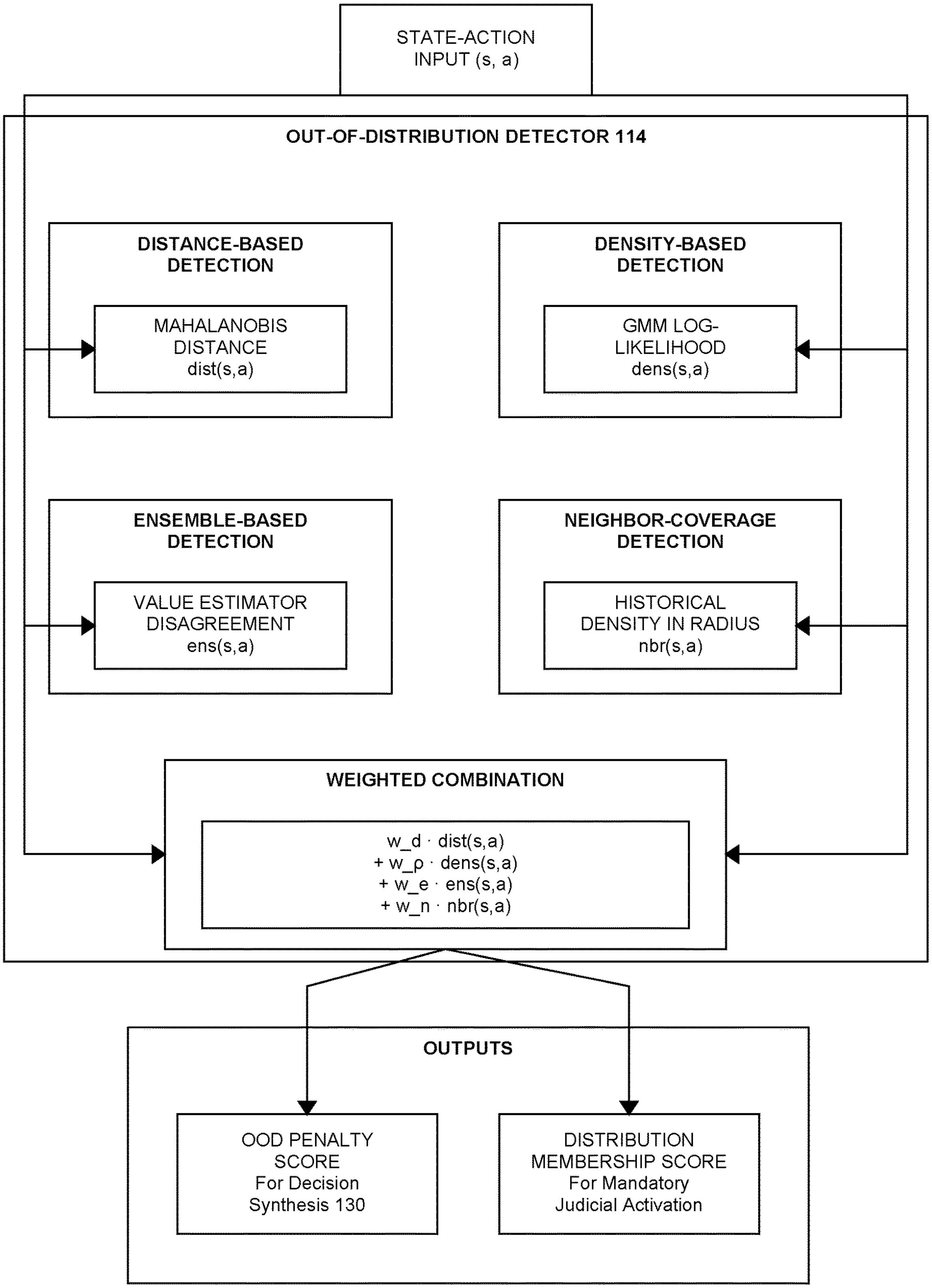
FIG. 6 is a block diagram illustrating an out-of-distribution (OOD) detection module (114), which in certain embodiments implements a hybrid combination of distance-based, density-based, ensemble-based, and neighbor-coverage detection techniques, according to an embodiment of the present invention.
Figure 7:
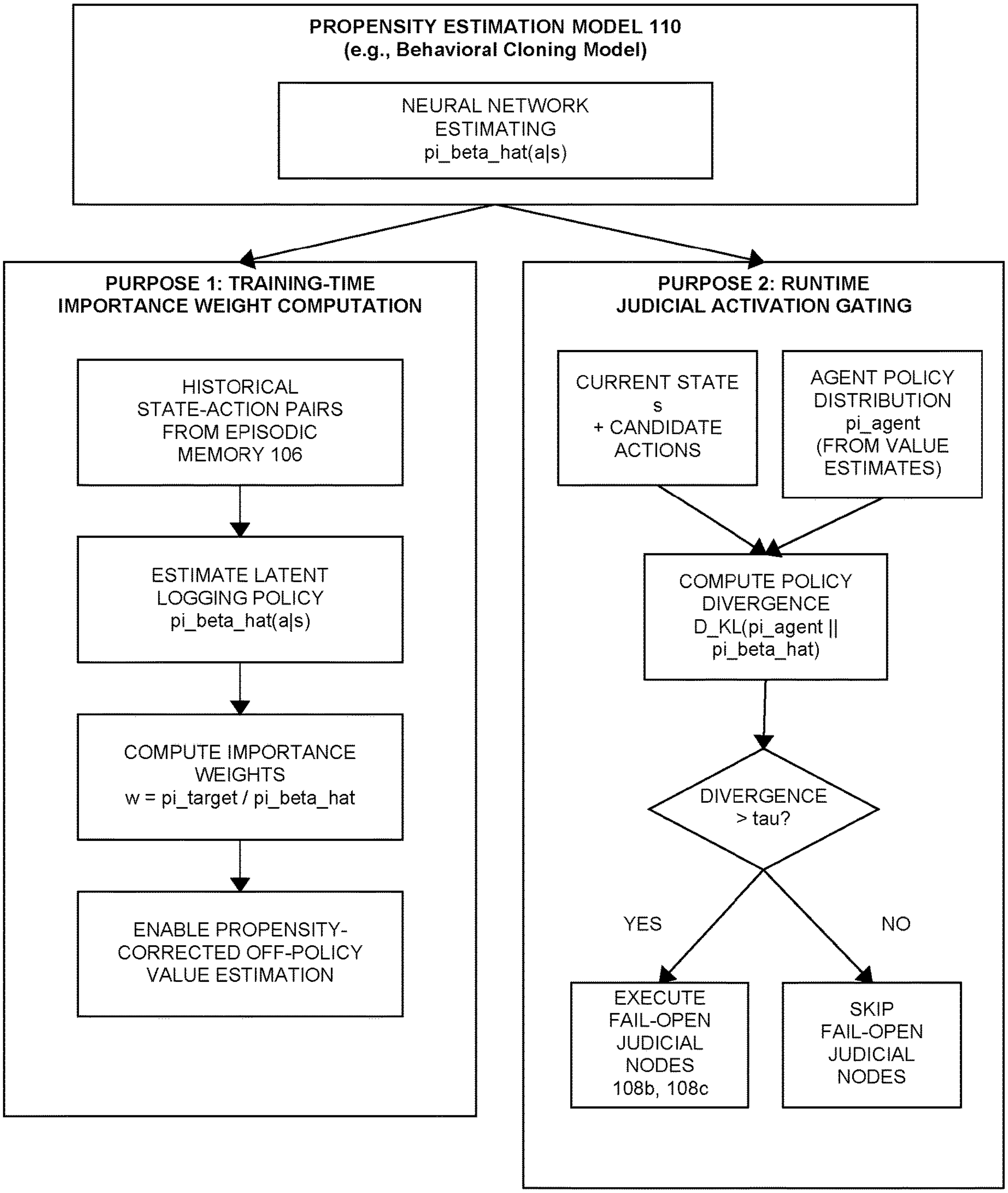
FIG. 7 is a block diagram illustrating a propensity estimation model (110), such as a behavioral cloning model configured to estimate logging policy probabilities $\hat{\pi}$_β(a|s), showing both training-time importance weight computation and runtime judicial activation gating, according to an embodiment of the present invention.

Referring to FIG. 6, the out-of-distribution detector 114 computes an OOD penalty score as a weighted combination of multiple detection methods. In a preferred embodiment, the OOD penalty is computed as:

$$\text{OOD}(s,a)=w\_d\cdot\text{dist}(s,a)+w\_\rho\cdot\text{dens}(s,a)+w\_e\cdot\text{ens}(s,a)+w\_n\cdot\text{nbr}(s,a)$$

where the component scores comprise: (i) dist(s,a): a distance-based metric such as Mahalanobis distance from a training distribution centroid (weight w_d); (ii) dens(s,a): a density-based metric such as Gaussian mixture model log-likelihood (weight w_ρ); (iii) ens (s,a): an ensemble disagreement metric based on variance across multiple value estimators (weight w_e); and (iv) nbr(s,a): a neighbor coverage metric based on the density of historical state-action pairs within a configurable radius of the current state-action pair (weight w_n).

The out-of-distribution detector 114 additionally generates a distribution membership score indicating whether the current state falls within the support of the historical decision log. This score is used for mandatory judicial activation.

The component weights (w_d, w_ρ, w_e, w_n) are calibrated during deployment based on validation data and may be adjusted to emphasize different aspects of distribution shift detection depending on the deployment domain.

11. Deployment Cold Start Protocol

Figure 9:
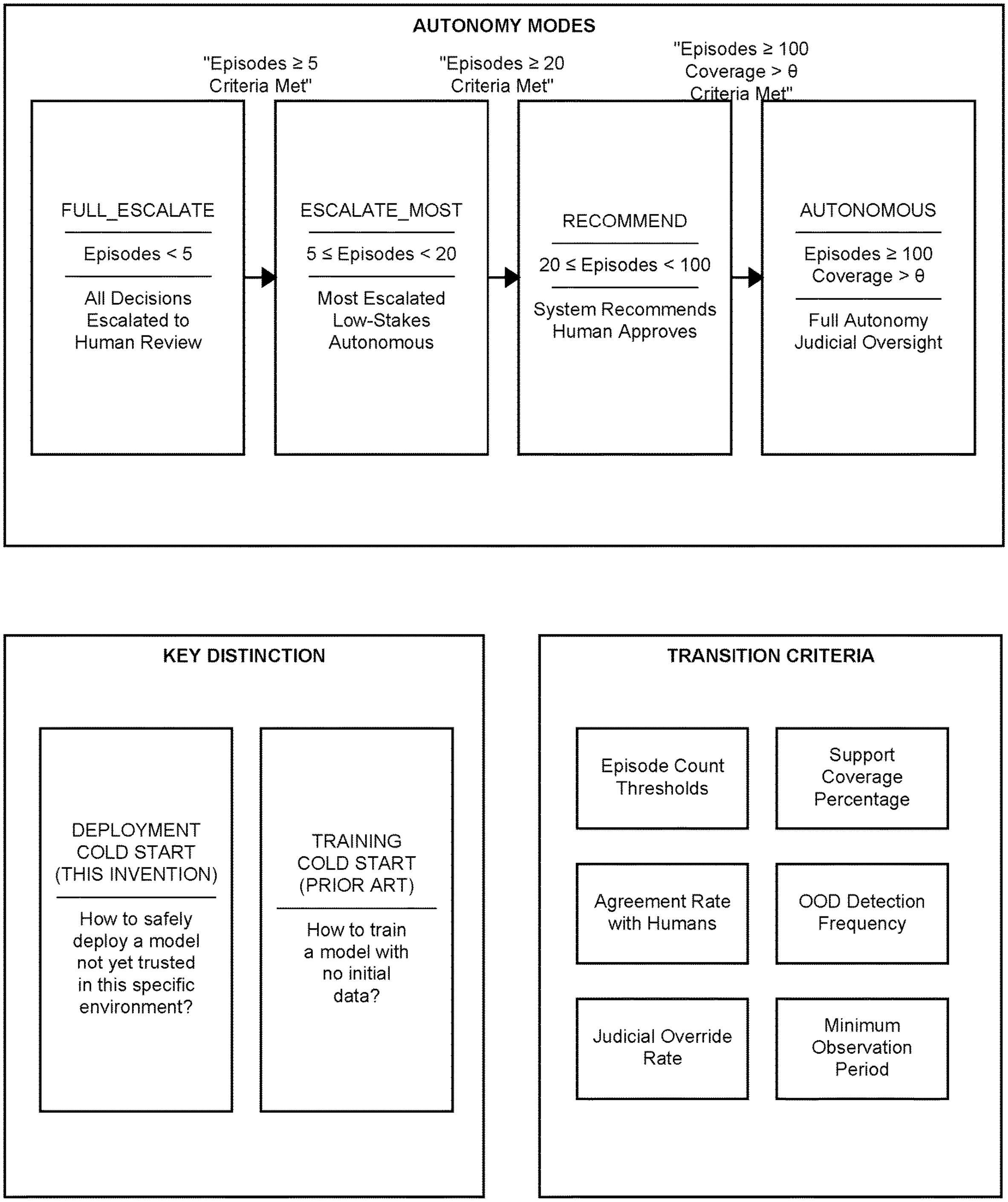
FIG. 9 is a state transition diagram illustrating exemplary operating modes of a cold start handler and corresponding autonomy levels according to an embodiment of the present invention, distinguishing deployment cold start from training cold start.

Referring to FIG. 9, a cold start handler implements graduated autonomy modes based on episode accumulation and performance metrics. This addresses the deployment trust-building problem, which is categorically distinct from training cold start problems addressed in prior art (where the concern is fitting model parameters with limited data).

FULL_ESCALATE mode: When episode count is below min_episodes_for_operate (default 5), all decisions are routed to human review regardless of judicial verdicts or value estimates.

ESCALATE MOST mode: When episode count is between min_episodes_for_operate and an intermediate threshold (e.g., 5≤episodes<20), most decisions are escalated to human review, with only low-stakes actions (as determined by a configurable stake threshold) handled autonomously with judicial oversight.

RECOMMEND mode: When episode count is between the intermediate threshold and min_episodes_for_autonomous (e.g., 20≤episodes<100), the system provides recommendations to human operators, who must approve each action before execution.

AUTONOMOUS mode: When episode count exceeds min_episodes_for_autonomous and support coverage exceeds a configurable threshold, the system operates autonomously with judicial oversight.

"Support coverage" refers to a measure of how many historical decision events in the episodic memory store 106 contain state-action pairs similar to the current state observation and candidate actions. In a preferred embodiment, support coverage is computed as the fraction of the relevant state-action space for which neighbor density exceeds a minimum threshold, indicating sufficient historical data for reliable value estimation.

Transition between autonomy modes is conditioned on multiple criteria evaluated over a minimum observation period: (i) episode count thresholds; (ii) support coverage percentage; (iii) agreement rate between system recommendations and human decisions; (iv) out-of-distribution detection frequency; and (v) judicial override rate (frequency of human overrides of system recommendations). Autonomy level increases only when all applicable criteria are satisfied.

12. Verifiable Replay Audit Record

Each decision event generates a complete audit record 134 sufficient to enable verification of decision provenance and substantially deterministic replay of the decision process. The audit record comprises: decision identifier and timestamp; frozen state snapshot; list of candidate actions; propensity estimates $\hat{\pi}\_\beta(a|s)$ for each candidate action under the logging policy; all judicial verdicts with citations, confidence scores, and processing latencies; value estimates $\hat{V}(s,a)$, uncertainty scores U(s,a), and OOD scores for each candidate action; final Judicial-Adjusted Value scores and selected action; current autonomy mode; model version identifiers for all components (value estimation model 112, propensity estimation model 110, judicial nodes 108, OOD detector 114); and a cryptographic hash covering the complete decision record.

The cryptographic hash is computed over a canonical serialization of the complete audit record using SHA-256 or an equivalent cryptographic hash function, ensuring that any modification to any field will produce a different hash value. This enables third-party verification that an audit record has not been tampered with since creation, supporting regulatory compliance and forensic analysis.

The audit record also forms a basis for constructing episodic trajectories used by the value estimation model 112 in subsequent training or retraining phases, enabling closed-loop improvement of the decision system.

13. Dynamic Fail-Mode Elevation

In advanced embodiments, fail-mode semantics may be dynamically elevated based on runtime context. When a risk elevation score exceeds a configurable threshold, judicial nodes configured as fail-open may temporarily elevate to fail-closed behavior, providing adaptive safety margins in uncertain conditions.

In a preferred embodiment, the risk elevation score is computed as a weighted combination of at least one of: the out-of-distribution score OOD (s,a) from detector 114; a measure of state variability across recent decisions (indicating operational volatility); and a domain-specific estimate of decision stakes (e.g., financial exposure, regulatory risk, or reputational impact). When the risk elevation score exceeds a configured threshold, Brand judicial node **108*b* and/or Strategy judicial node 108*c*** temporarily adopt fail-closed semantics, causing timeouts to block actions rather than proceeding with warnings.

14. Model Health Monitoring

Figure 10:
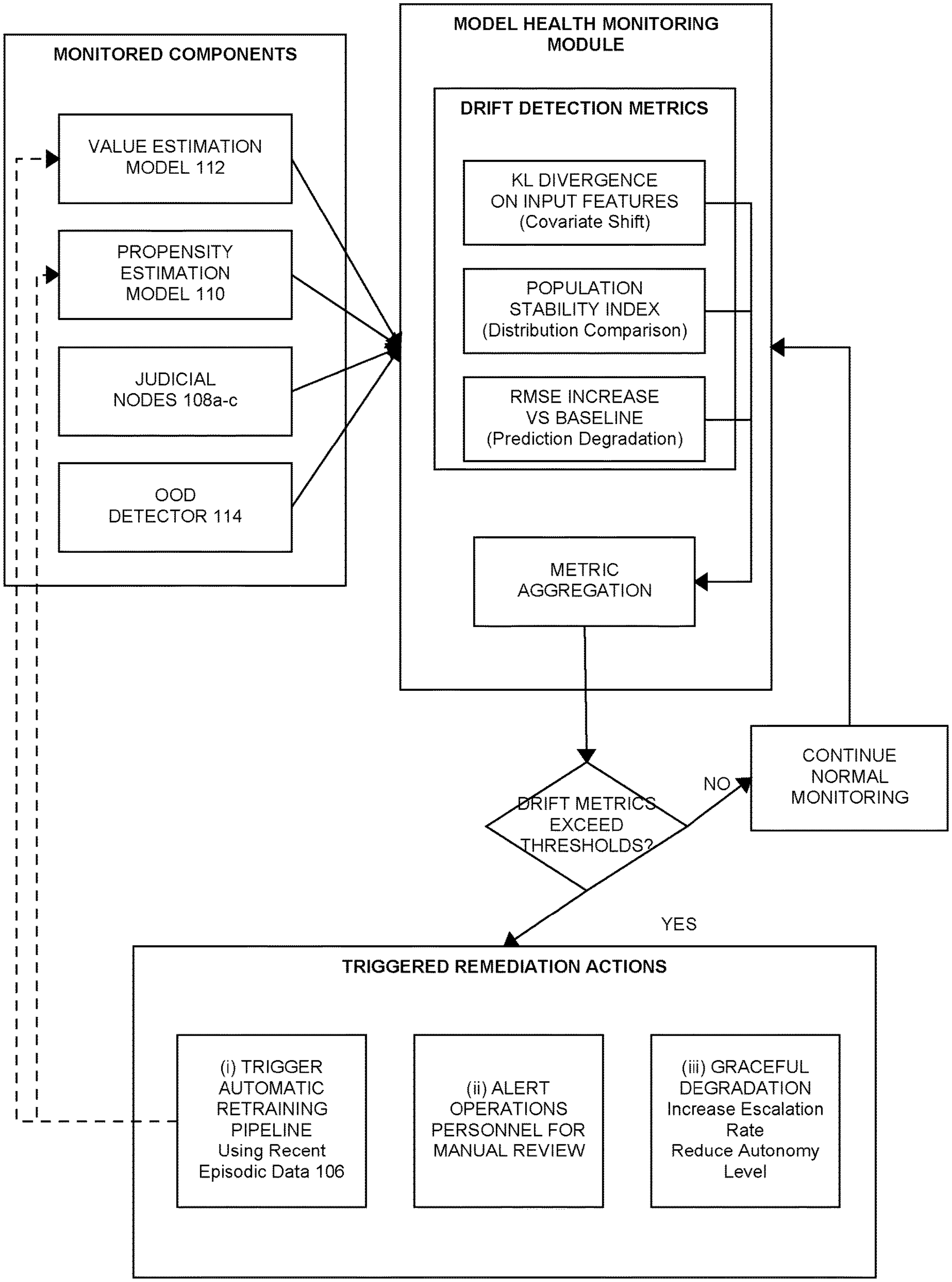
FIG. 10 is a block diagram illustrating a model health monitoring module and associated retraining pipeline according to an embodiment of the present invention, including drift detection metrics and triggered remediation actions.

Referring to FIG. 10, the system includes a model health monitor configured to detect drift in one or more of: the value estimation model 112, the propensity estimation model 110, the judicial nodes **108*a*-108*c*, and the out-of-distribution detector 114**.

Drift detection employs metrics including: KL divergence on input feature distributions (detecting covariate shift); Population Stability Index (PSI) comparing current and baseline distributions; and RMSE increase relative to baseline performance (detecting prediction degradation).

When drift metrics exceed configured thresholds, the monitor may trigger one or more remediation actions: (i) automatic retraining of affected models using recent episodic data from the memory store 106; (ii) alerting operations personnel for manual review; and (iii) activating graceful degradation mode wherein the system increases escalation frequency (temporarily reducing autonomy level) until models are recalibrated.

15. Hierarchical Verdict Aggregation

Figure 4:
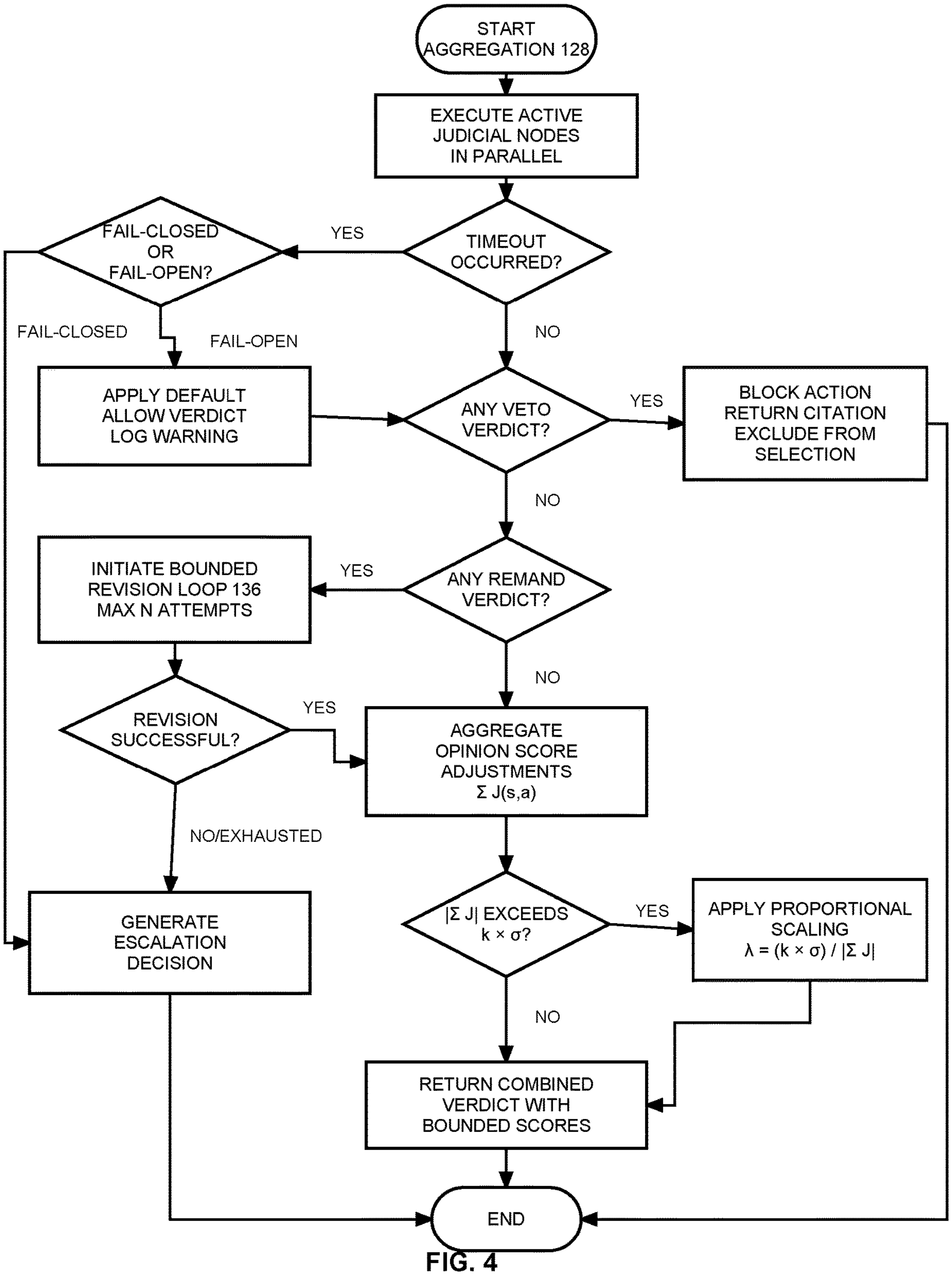
FIG. 4 is a flowchart illustrating a Judicial Council verdict aggregation process (128) that receives verdicts from multiple judicial nodes and resolves them according to a precedence hierarchy, including timeout handling and bounded score adjustment, according to an embodiment of the present invention.
Figure 5:
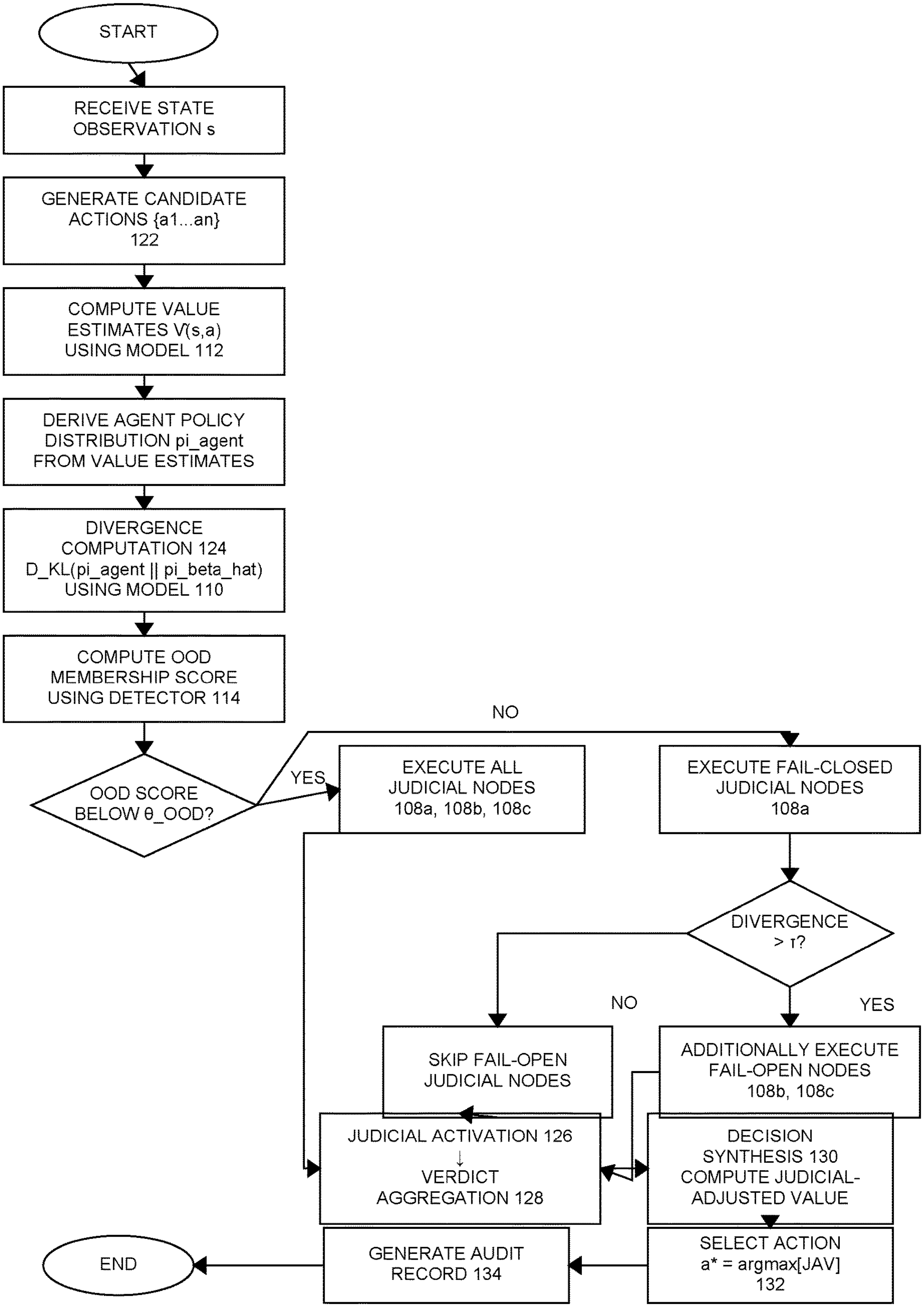
FIG. 5 is a flowchart illustrating an exemplary decision flow according to an embodiment of the present invention, including propensity-based divergence computation (124), selective judicial activation (126), verdict aggregation (128), and decision synthesis (130).

Referring to FIG. 4, the Judicial Council 116 (verdict aggregation module 128) aggregates verdicts from multiple judicial nodes according to a precedence-based protocol. The aggregation process proceeds as follows:

First, all judicial nodes **108*a*-108*c* execute in parallel with independent timeouts. When a timeout occurs, the fail-mode semantics of the timed-out node are applied: fail-closed nodes (e.g., Compliance judicial node 108*a*) cause immediate escalation to human review with the partial verdict set logged; fail-open nodes (e.g., Brand judicial node 108*b*, Strategy judicial node 108*c***) are treated as issuing an implicit ALLOW verdict with a timeout warning logged for monitoring purposes.

Second, verdicts are processed according to the precedence hierarchy: VETO>REMAND>OPINION>ALLOW. If any judicial node issues a VETO verdict, the action is blocked regardless of any favorable OPINION scores from other judicial nodes, and the VETO citation is returned for audit purposes and operator review. If no VETO exists but any node issues a REMAND verdict, the bounded revision loop (Section 8) is initiated regardless of aggregate OPINION adjustments. Only when no VETO or REMAND verdicts exist do OPINION score adjustments proceed to aggregation.

Third, OPINION score adjustments from all judicial nodes are summed and subjected to the bounded aggregate adjustment constraint described in Section 7. The final bounded aggregate adjustment $\Sigma$ J(s,a) is passed to the decision synthesis module 130.

When multiple judicial nodes issue verdicts of equal enforcement power that conflict (e.g., two judicial nodes both capable of VETO where one issues VETO and another issues ALLOW), the more restrictive verdict prevails. For OPINION verdicts with opposite-sign score adjustments, simple algebraic summation is applied, with the bounded aggregate constraint (Section 7) providing stability. Alternative embodiments may implement configurable conflict resolution rules such as weighted voting or domain-priority ordering.

What is claimed is:

1. A computer-implemented autonomous enterprise decision system comprising:

non-volatile memory storing:

(i) an episodic memory store containing historical decision events;

(ii) a plurality of policy evaluation module configurations, each associated with a constraint domain, a maximum enforcement category selected from unconditional-block, conditional-block, and non-blocking value-adjustment, and a timeout failure mode selected from fail-closed and fail-open;

(iii) a propensity estimation model configured to estimate a latent logging policy probability distribution $\pi\beta$ over actions given a state; and (iv) a value estimation model configured to compute value estimates for state-action pairs;

a processor coupled to the non-volatile memory and configured to:

(a) receive a state observation and generate a set of candidate actions;

(b) compute, using the value estimation model, value estimates for state-action pairs corresponding to the state observation and the set of candidate actions;

(c) compute, using the propensity estimation model, a policy divergence metric between an agent policy distribution over the set of candidate actions, wherein the agent policy distribution is derived from the value estimates computed in step (b), and the estimated latent logging policy probability distribution for the state observation;

(d) for each candidate action of the set of candidate actions, execute, via independent computational pathways with independent timeouts, policy evaluation modules corresponding to policy evaluation module configurations having fail-closed timeout failure mode, and responsive to the policy divergence metric exceeding a configurable activation threshold, additionally execute policy evaluation modules corresponding to policy evaluation module configurations having fail-open timeout failure mode, wherein each executed policy evaluation module outputs a machine-readable evaluation output data structure comprising at least an output-type field, a score-adjustment field, and a feedback field;

(e) aggregate, via a verdict aggregation module, the machine-readable evaluation output data structures according to a deterministic precedence hierarchy wherein unconditional-block outputs take precedence over conditional-block outputs, which take precedence over non-blocking value-adjustment outputs;

(f) responsive to an unconditional-block output, exclude the corresponding candidate action from selection;

(g) responsive to a conditional-block output, initiate a bounded revision loop comprising generating revised candidate actions based on feedback from the conditional-block output and terminating after a configurable maximum number of revision attempts;

(h) responsive to a timeout condition in a policy evaluation module having fail-closed timeout failure mode, block autonomous execution of the corresponding candidate action and generate an escalation record;

(i) for non-excluded candidate actions, compute a composite action value by combining: (i) a base value estimate from the value estimation model, and (ii) transduced scalar scores derived from non-blocking value-adjustment outputs and calibrated to a statistical dispersion measure of the value estimates, wherein an absolute sum of the transduced scalar scores for the candidate action is constrained to be no greater than a configurable multiple of the statistical dispersion measure;

(j) select the candidate action maximizing the composite action value; and (k) generate an audit record comprising the machine-readable evaluation output data structures aggregated for the selected candidate action, the composite action value, a model version identifier of the value estimation model, and a cryptographic hash computed over a canonical serialization of the audit record.

2. The system of claim 1, wherein the processor is further configured to subtract an out-of-distribution penalty from the composite action value.

3. The system of claim 2, wherein the out-of-distribution penalty is derived from a weighted combination of at least two of: a Mahalanobis distance metric, an ensemble disagreement metric, a density-based metric, and a neighbor coverage metric.

4. The system of claim 1, wherein the processor is further configured to: responsive to a timeout condition in a policy evaluation module having fail-closed timeout failure mode, block autonomous execution of the corresponding candidate action and generate an escalation record with the partial machine-readable evaluation output set logged; and responsive to a timeout condition in a policy evaluation module having fail-open timeout failure mode, proceed with aggregation treating the policy evaluation module as having issued an implicit ALLOW output and generating a timeout warning record.

5. The system of claim 1, further comprising an augmentation module configured to, upon successful resolution of the bounded revision loop, insert the revised candidate action into the episodic memory store with an elevated priority weight greater than a default priority weight assigned to standard historical decision events, thereby generating a counterfactual training example.

6. The system of claim 1, wherein the transduced scalar scores are computed by a transduction function that normalizes score adjustments from non-blocking value-adjustment outputs such that a score-adjustment magnitude of 1.0 corresponds to one empirical standard deviation of value estimates observed in the episodic memory store.

7. The system of claim 1, wherein the plurality of policy evaluation module configurations comprises:

a compliance policy evaluation module configuration with unconditional-block enforcement category, fail-closed timeout failure mode, and a latency target of less than approximately 50 milliseconds;

a brand policy evaluation module configuration with conditional-block enforcement category, fail-open timeout failure mode, and a latency target of less than approximately 500 milliseconds; and a strategy policy evaluation module configuration with non-blocking value-adjustment enforcement category, fail-open timeout failure mode, and a latency target of less than approximately 100 milliseconds.

8. The system of claim 1, wherein the processor is further configured to apply proportional scaling to the transduced scalar scores when an absolute sum of the transduced scalar scores for the candidate action would exceed a configurable multiple of the statistical dispersion measure of the value estimates, such that a scaled sum of the transduced scalar scores equals the configurable multiple of the statistical dispersion measure.

9. The system of claim 1, further comprising a cold start handler configured to determine an autonomy mode based on an accumulated count of decision events in the episodic memory store and at least one performance metric, wherein the autonomy mode is selected from the group consisting of FULL_ESCALATE, ESCALATE_MOST, RECOMMEND, and AUTONOMOUS.

10. The system of claim 2, wherein the processor is further configured to execute all policy evaluation modules regardless of the policy divergence metric responsive to a distribution membership score from an out-of-distribution detector falling below a configurable out-of-distribution threshold.

11. The system of claim 4, wherein the processor is further configured to dynamically elevate policy evaluation modules having fail-open timeout failure mode to fail-closed behavior when a risk elevation score computed from at least an out-of-distribution score exceeds a configurable risk threshold.

12. The system of claim 1, wherein the processor is further configured to generate an audit record comprising model version identifiers and a cryptographic hash covering decision inputs and outputs, wherein the cryptographic hash is computed using SHA-256 or an equivalent cryptographic hash function over a canonical serialization of the audit record.

13. A computer-implemented method for latency-constrained autonomous agent action selection, the method comprising:

(a) receiving, by a processor, a state observation and generating a set of candidate actions for the state observation;

(b) computing, using a value estimation model, value estimates for state-action pairs corresponding to the state observation and the set of candidate actions;

(c) estimating, using a propensity estimation model, a latent logging policy probability distribution over actions for the state observation based on historical decision events stored in an episodic memory store;

(d) computing a policy divergence metric between an agent policy distribution over the set of candidate actions, wherein the agent policy distribution is derived from the value estimates computed in step (b), and the estimated latent logging policy probability distribution;

(e) executing, via independent computational pathways with independent timeouts, for each candidate action, policy evaluation modules having fail-closed timeout failure mode, and responsive to the policy divergence metric exceeding a threshold, additionally executing policy evaluation modules having fail-open timeout failure mode, wherein each executed policy evaluation module outputs a machine-readable evaluation output data structure;

(f) aggregating the machine-readable evaluation output data structures from the executed policy evaluation modules according to a deterministic precedence hierarchy wherein unconditional-block outputs take precedence over conditional-block outputs, which take precedence over non-blocking value-adjustment outputs;

(g) responsive to a conditional-block output, executing a bounded revision loop to generate a revised action, and upon successful resolution, injecting the revised action into the episodic memory store with a priority weight greater than a default priority weight;

(h) responsive to a timeout condition in a policy evaluation module having fail-closed timeout failure mode, blocking autonomous execution of the candidate action and generating an escalation record;

(i) selecting and executing an action that maximizes a composite action value comprising a combination of a value estimate and transduced non-blocking value-adjustment scores calibrated to a statistical dispersion measure of the value estimates, wherein an absolute sum of the transduced non-blocking value-adjustment scores for a candidate action is constrained to be no greater than a configurable multiple of the statistical dispersion measure, subject to no unresolved unconditional-block or conditional-block outputs; and (i) generating an audit record comprising the machine-readable evaluation output data structures, the composite action value, a model version identifier, and a cryptographic hash computed over a canonical serialization of the audit record.

14. The method of claim 13, wherein the transduced non-blocking value-adjustment scores are calculated by mapping semantic assessments from non-blocking value-adjustment outputs to scalar values calibrated to a distribution of value estimates in the episodic memory store.

15. The method of claim 13, wherein executing policy evaluation modules further comprises applying differentiated timeout semantics such that a timeout in a policy evaluation module having fail-closed timeout failure mode blocks autonomous execution of the candidate action and generates an escalation record and a timeout in a policy evaluation module having fail-open timeout failure mode proceeds with aggregation treating the policy evaluation module as having issued an implicit ALLOW output and generating a timeout warning record.

16. The method of claim 13, further comprising applying proportional scaling to the transduced non-blocking value-adjustment scores when an absolute sum of the transduced non-blocking value-adjustment scores for a candidate action would exceed a configurable multiple of the statistical dispersion measure of the value estimates, such that a scaled sum equals the configurable multiple of the statistical dispersion measure.

17. The method of claim 13, further comprising generating an audit record comprising all machine-readable evaluation output data structures, value estimates, model version identifiers, and a cryptographic hash computed using SHA-256 or an equivalent cryptographic hash function over a canonical serialization of the audit record.

18. A non-transitory computer-readable medium storing instructions that, when executed by a processor, cause the processor to perform operations comprising:

(a) receiving a state observation and generating a set of candidate actions for the state observation;

(b) computing, using a value estimation model, value estimates for state-action pairs corresponding to the state observation and the set of candidate actions;

(c) computing, using a propensity estimation model, a policy divergence metric between an agent policy distribution over the set of candidate actions, wherein the agent policy distribution is derived from the value estimates computed in step (b), and an estimated latent logging policy probability distribution for the state observation;

(d) executing via independent computational pathways with independent timeouts, policy evaluation modules having fail-closed timeout failure mode unconditionally for each candidate action of the set of candidate actions, and responsive to the policy divergence metric exceeding a configurable threshold, additionally executing policy evaluation modules having fail-open timeout failure mode, each executed policy evaluation module outputting a machine-readable evaluation output data structure comprising at least an output-type field, a score-adjustment field, and a feedback field;

(e) aggregating the machine-readable evaluation output data structures, via a verdict aggregation module, according to a deterministic precedence hierarchy wherein unconditional-block outputs take precedence over conditional-block outputs, which take precedence over non-blocking value-adjustment outputs;

(f) computing a composite action value for each candidate action by combining a base value estimate with transduced scalar scores derived from non-blocking value-adjustment outputs and calibrated to a statistical dispersion measure of the value estimates, wherein an absolute sum of the transduced scalar scores for the candidate action is constrained to be no greater than a configurable multiple of the statistical dispersion measure;

(g) responsive to a timeout condition in a policy evaluation module having fail-closed timeout failure mode, blocking autonomous execution of the corresponding candidate action and generating an escalation record;

(h) selecting an action maximizing the composite action value subject to no unresolved unconditional-block or conditional-block outputs; and (i) generating an audit record comprising the machine-readable evaluation output data structures, the composite action value, a model version identifier, and a cryptographic hash computed over a canonical serialization of the audit record.

* * * * *